Patented Feb. 3, 1942

2,271,705

UNITED STATES PATENT OFFICE 2,271,705

PRODUCTION OF DI-CHLORINATED ALIPHATIC KETONES

Glen H. Morey, Terre Haute, Ind., assignor to Commercial Solvents Corporation, Terre Haute, Ind., a corporation of Maryland No Drawing. Application January 10, 1940,
Serial No. 313,204

4 Claims. (Cl. 260—593)

My invention relates to a process for the catalytic production of dichlorinated aliphatic ketones by the chlorination of monohalogenated aliphatic ketones in the liquid phase.

Prior practices in this field have dealt with the production of higher halogenated ketones by reacting the desired halogen with an aqueous solution of the ketones in the presence of an agent such as calcium carbonate, or some other suitable material which is capable of combining with the corresponding hydrogen halide liberated during the reaction. This procedure, however, proved to be cumbersome because of the fact that the desired halogenated ketone had to be separated from the precipitate formed thereby, and also because it was extremely difficult to avoid a loss of the product in separating the halide salt from the reaction mixture.

Other procedures have been concerned with the preparation of higher halogenated aliphatic ketones in the liquid phase by reacting the desired halogen with a monohalogenated aliphatic ketone at a temperature substantially below the boiling point of the monohalogenated aliphatic ketone. In accordance with this process, relatively good yields of chlorinated products containing three or more chlorine atoms may be secured; however no dichlorinated products are produced.

I do not desire to obtain these highly chlorinated ketones, which were the only type readily obtainable by prior art methods, but it is an object of my invention to prepare the dichlorinated products since such chlorinated ketones, in general, possess greater utility in organic syntheses than the more highly chlorinated ketones.

In accordance with my invention, the pure monochlorinated aliphatic ketone or solution thereof, is heated to a temperature sufficient to effect the satisfactory elimination of the hydrogen chloride formed during the reaction, said temperature being, in general, equal to the boiling point of the monochlorinated aliphatic ketone or slightly below. Chlorine is then run into the hot monochlorinated aliphatic ketone, or solution thereof, in the presence of a suitable chlorination catalyst, at a rate such that optimum contact is obtained between the chlorine and the monochlorinated aliphatic ketone. Chlorination in this manner is continued usually, until a 10 per cent excess of chlorine over the amount required to form the dichloro ketone has been used. The hydrogen chloride formed during the reaction is eliminated from the reaction mixture in the form of a vaporous mixture of hydrogen chloride and monochlorinated ketone, the mono chloroketone separated from the mixture by condensing it at a temperature above the condensation temperature of hydrogen chloride and the mono chloroketone returned to the reaction mixture. The crude dichlorinated aliphatic ketone, produced in this manner, is then subjected to fractional distillation and obtained in a substantially pure form. Where monochloroacetone is chlorinated, in accordance with my process, unsymmetrical dichloroacetone is the chief product but there is frequently produced a small amount of symmetrical dichloroacetone, together with a still smaller portion of more highly chlorinated acetone. However, the quantity of such materials rarely exceeds 10 per cent of the total reaction product, whereas the unsymmetrical dichloroacetone can be consistently produced in yields of 60–65 per cent.

In instances where dry monochlorinated aliphatic ketones are utilized, the temperature of the chlorination reaction is observed to drop to a constant value intermediate between the boiling point of water and the chloro ketone which is being chlorinated. The decrease in temperature is attributed to the fact that water is produced during the reaction by certain condensation reactions. This phenomenon is especially true in the case of the lower molecular weight mono chloroketones such as monochloroacetone. However, as the molecular weight of the chloro ketone increases the depression in boiling point becomes less, since monochloro ketones of higher molecular weight do not tend to condense as readily under the above described conditions as their lower homologues. The preferred temperature limits therefore, in carrying out my invention, are the constant value reached by the elimination of water during the reaction and the boiling point of the pure monochloroketone. This optimum temperature range, in the case of monochloroacetone, is approximately 105–120° C., and in carrying out the chlorination reaction the solution should be maintained within this range at all times in order to aid in the satisfactory removal of hydrogen chloride from the reaction mixture.

According to the present invention, dichloroaliphatic ketones of any of the corresponding monochlorinated aliphatic ketones may be prepared. However, the type of dichloro ketones produced in accordance with my invention has been found to vary with the monochlorinated aliphatic ketone employed as the starting material. For example, in the case of monochloroacetone the predominating reaction product has been found to be unsymmetrical dichloroacetone. However, in the case of chloroethyl methyl ketone the reaction product constitutes, in general, approximately equal amounts of symmetrical and unsymmetrical dichlorinated products.

The chlorination catalysts, employed in my process, may be any of the common halogenation catalysts, such as iodine, antimony trichloride, ferric chloride, light, etc., the selection of which, in certain instances, is dependent upon the reaction conditions employed. The solvents employed, if desired, for the mono chloroketone, may be any organic liquid possessing a boiling point of such a character that said liquid does not interfere in any manner with the removal of the hydrogen chloride produced. It is also desired that such solvents be inert with respect to the reactants under the conditions set forth.

The following examples are illustrative of my invention:

Example I

Twelve hundred and sixty-seven parts by weight of monochloroacetone, having a chlorine content of 39.84 per cent, together with 1 part by weight of iodine, were placed in a reaction vessel. The contents of the vessel were then heated to boiling temperature, and chlorine was conducted into the mixture at the rate of 158 parts by weight per hour. The boiling point of the reaction mixture gradually fell from 118° C. to 105° C. at which value it remained constant during the balance of the reaction. Chlorination of the mixture was continued until a 10 per cent excess over the amount required to form dichloroacetone was used. The resulting crude product was then fractionated and the portion boiling at 115–120° collected. This fraction amounted to 1103 parts by weight, corresponding to a yield of 62.8 per cent of unsymmetrical dichloroacetone.

The following table gives the results obtained with other catalysts, in accordance with the procedure described above:

| Catalyst | Unsymmetrical dichloroacetone, percent yield | Symmetrical dichloroacetone and higher chlorinated products, percent yield |
|---|---|---|
| SbCl$_3$ | 63.8 | |
| FeCl$_3$ | 66.0 | 9.8 |
| Light | 65.7 | |

Example II

The dichlorinated derivatives of 3-chloro-2-butanone were prepared in accordance with the procedure described in Example I, with the exception that only the theoretical quantity of chlorine was reacted with the 3-chloro-2-butanone (607 parts by weight) at a temperature of 114–117° C. in the presence of light as a catalyst. The crude reaction product resulting was fractionally distilled and two separate fractions were obtained. The first fraction, boiling at 115–119° C. amounted to 234 parts by weight. Approximately 49 per cent of this fraction consisted of 3,3-dichloro-2-butanone. The second fraction, consisting of 1,3-dichloro-2-butanone and boiling at 162–165° C., amounted to 233 parts by weight, corresponding to a yield of 29 per cent based on the 3-chloro-2-butanone.

My invention is not limited to the above examples, but includes equivalents and obvious modifications thereof. For example the water produced during chlorination may be withdrawn from the zone of reaction, if desired, by means of the addition of a solid dehydrating agent such as anhydrous calcium sulfate or the like.

My invention now having been described, what I claim is:

1. In a process of the production of dichlorinated aliphatic ketones from monochlorinated aliphatic ketones, the step which comprises chlorinating a solution of monochlorinated aliphatic ketone in the presence of a chlorination catalyst at approximately the boiling point of the monochlorinated aliphatic ketone-containing solution.

2. In a process for the production of dichlorinated aliphatic ketones from monochlorinated aliphatic ketones, the step which comprises chlorinating said monochlorinated aliphatic ketone in the presence of a chlorination catalyst at approximately the boiling point of the monochlorinated aliphatic ketone.

3. In a process for the production of dichloroacetone from monochloroacetone, the step which comprises chlorinating said monochloroacetone in the presence of a chlorination catalyst, at approximately the boiling point of the reaction mixture.

4. In a process for the production of dichlorinated methyl ethyl ketone from 3-chloro-2-butanone, the step which comprises chlorinating said 3-chloro-2-butanone in the presence of a chlorination catalyst, at approximately the boiling point of the reaction mixture.

GLEN H. MOREY.